(12) United States Patent
Vulpis

(10) Patent No.: US 11,255,466 B2
(45) Date of Patent: Feb. 22, 2022

(54) DEVICES AND METHODS FOR REPLACING EXISTING UTILITY PIPING

(71) Applicant: Joseph L. Vulpis, Glen Cove, NY (US)

(72) Inventor: Joseph L. Vulpis, Glen Cove, NY (US)

( * ) Notice: Subject to any disclaimer, the term of this patent is extended or adjusted under 35 U.S.C. 154(b) by 0 days.

(21) Appl. No.: 17/093,318

(22) Filed: Nov. 9, 2020

(65) Prior Publication Data

US 2021/0140563 A1    May 13, 2021

Related U.S. Application Data

(60) Provisional application No. 62/932,919, filed on Nov. 8, 2019.

(51) Int. Cl.
*F16L 1/028* (2006.01)
*F16L 1/09* (2006.01)

(52) U.S. Cl.
CPC ............... *F16L 1/09* (2013.01); *F16L 1/028* (2013.01)

(58) Field of Classification Search
CPC ............ F16L 55/30; F16L 55/18; F16L 1/028
USPC ............................ 405/174, 184, 184.1–184.5
See application file for complete search history.

(56) References Cited

U.S. PATENT DOCUMENTS 2,297,164 A * 9/1942 Rainwater ........... F16L 55/1608
                                                254/29 R
4,637,756 A * 1/1987 Boles ........................ E21B 7/30
                                                138/97

\* cited by examiner

*Primary Examiner* — Sunil Singh

(57) ABSTRACT

Devices and methods are provided for replacing buried utility piping while eliminating the need to perform a complete trench excavation to expose and remove the buried utility piping.

20 Claims, 3 Drawing Sheets

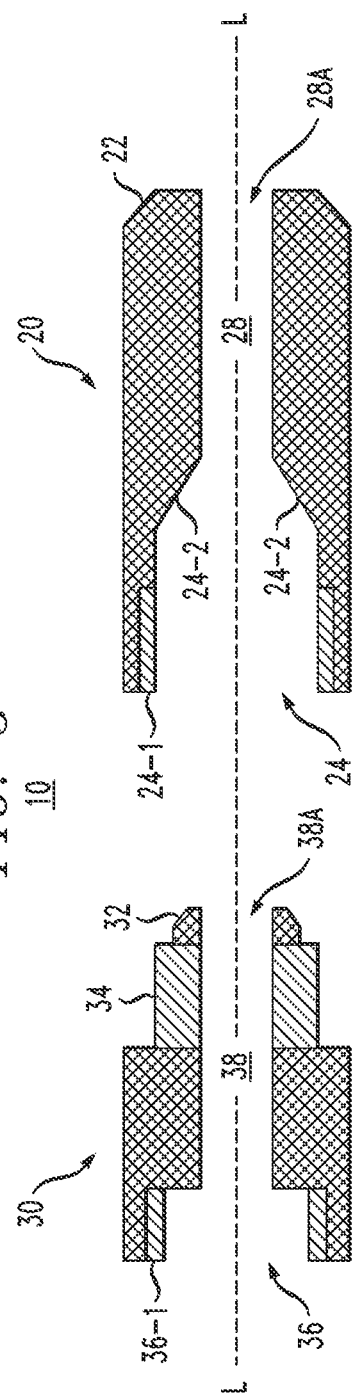
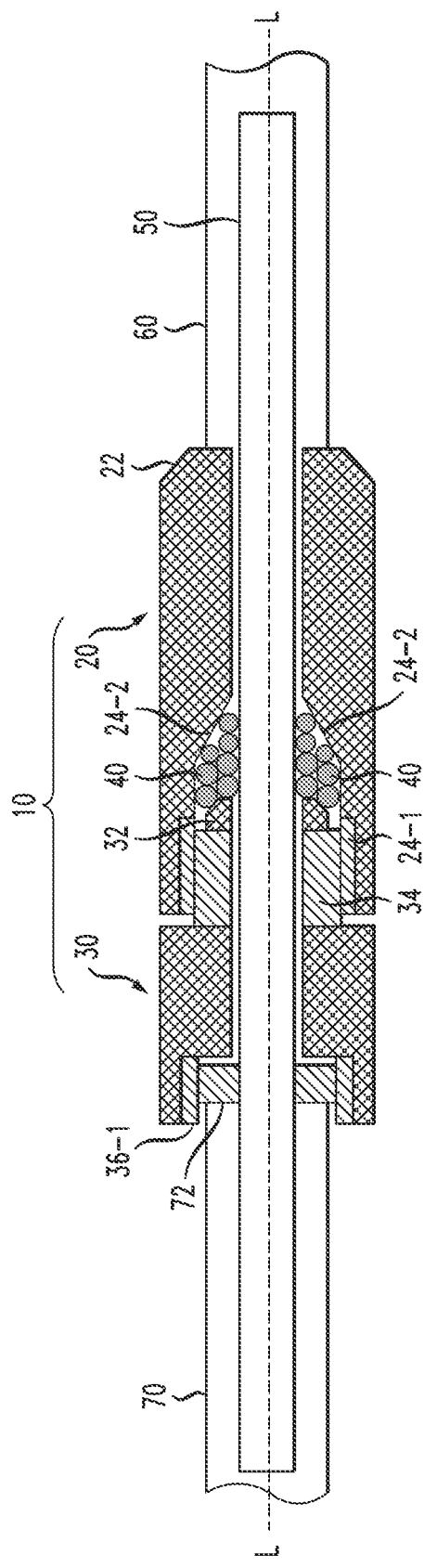

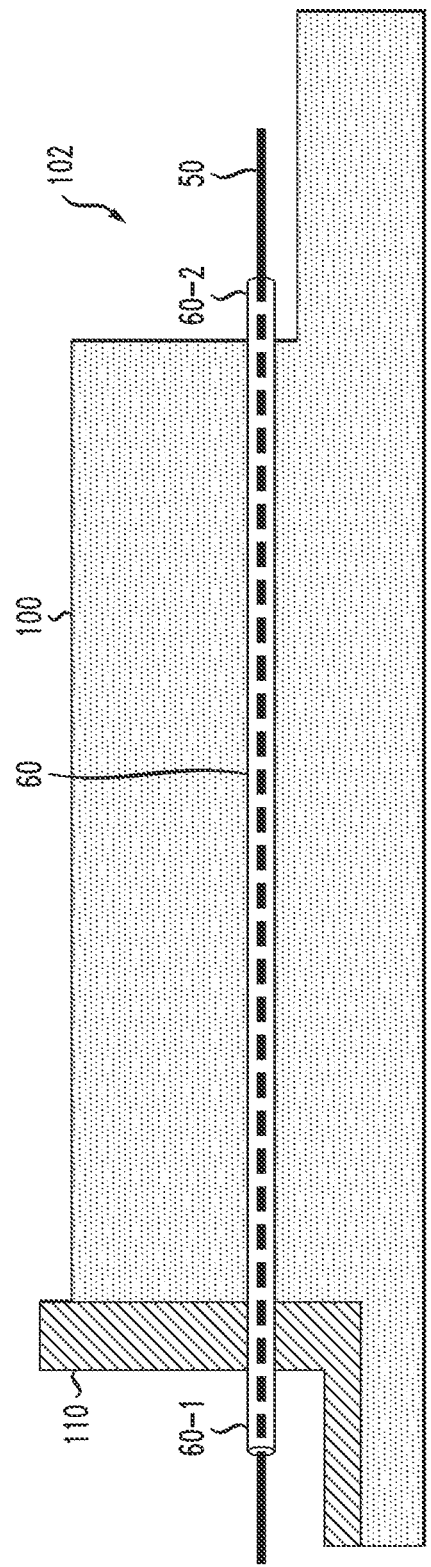
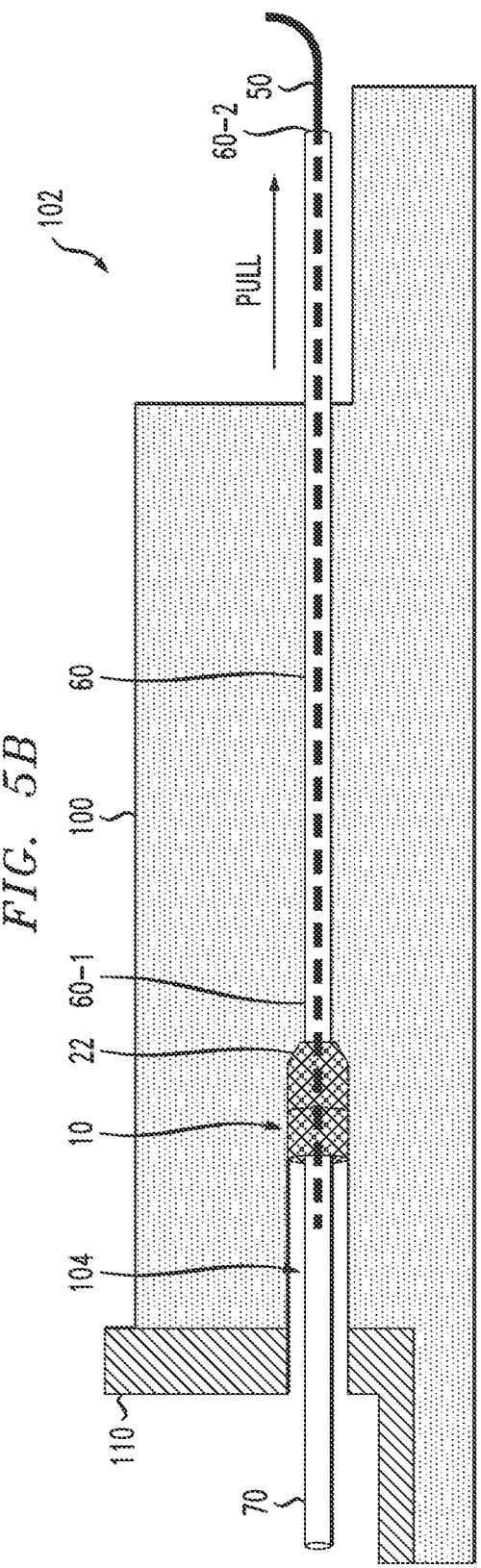

DEVICES AND METHODS FOR REPLACING EXISTING UTILITY PIPING

CROSS-REFERENCE TO RELATED APPLICATION

This application claims priority to U.S. Provisional Application Ser. No. 62/932,919, filed on Nov. 8, 2019, the disclosure of which is incorporated herein by reference.

BACKGROUND

This disclosure relates generally to techniques for replacing existing utility piping, such as electrical conduit, gas piping, water supply lines, etc., which is buried under ground. Conventional methods for replacing buried utility piping include open trench excavation methods which require excavating the ground to form a deep trench along an entire length of the buried pipe to thereby expose the buried pipe that is to be replaced. Once exposed, the existing buried pipe is removed and replaced with new pipe. Following installation of the new pipe, the trench is backfilled with the proper material (e.g., sand, dirt, etc.) and the ground is repaired as needed, e.g., restore top soil, grass, cement sidewalk panels, road pavement, etc., to fix the damage caused by the open trench excavation.

SUMMARY

Exemplary embodiments of the disclosure include devices and methods for replacing buried utility piping while eliminating the need to perform a complete trench excavation to expose and remove the buried utility piping.

In one embodiment, a device comprises a first member, a second member, and ball bearings. The first member comprises a first inner cylindrical channel, and a female threaded chamber. The second member comprises a second inner cylindrical channel, a male threaded portion, and a pipe adaptor connecting portion. The first member, the second member, and the ball bearings are configured for assembly with a pull cable inserted through the first and second inner cylindrical channels, wherein the first and second members are configured to be connectable by screwing the male threaded portion of the second member into the female threaded chamber of the first member with the ball bearings disposed within the female threaded chamber such that a tightening of the connection between the first and second members causes the male threaded portion of the second member to forcibly push the ball bearings against inner walls of the female threaded chamber and against a portion of the pull cable disposed in the female threaded chamber to thereby create a frictional compressive force against the pull cable which is sufficient to prevent the pull cable from sliding within the first and second inner cylindrical channels. The pipe adaptor connecting portion of the second member is configured for connection to a pipe adaptor element that is connected to an end of a pipe.

Another embodiment includes a method for replacing a buried pipe with a new pipe. The method includes exposing a first end and a second end of the buried pipe which is buried below ground and inserting a pull cable through of buried pipe, wherein a first end of the pull cable extends out from the first end of the buried pipe, and wherein a second end of the pull cable extends out from the second end of the buried pipe. A tool is connected to the first end of the pull cable which extends out from the first end of the buried pipe, and the new pipe is connected to the tool. The method further includes pulling the second end of the pull cable together with the second end of the buried pipe to thereby pull the buried pipe and the tool through the ground, wherein pulling the tool with the pull cable bores a channel in the ground, while pulling the new pipe connected to the tool through the bored channel within the ground.

BRIEF DESCRIPTION OF THE DRAWINGS

FIG. 3 is a schematic cross-sectional view of constituent components of the device along a center longitudinal axis, according to an exemplary embodiment of the disclosure.

FIG. 4 is a schematic cross-sectional view of the device with the constituent components assembled together with a pull cable coupled to the device, according to an exemplary embodiment of the disclosure.

FIGS. 5A and 5B schematically illustrate a method for utilizing the assembled device shown in FIG. 4 for replacing a buried pipe with a new pipe, according to an exemplary embodiment of the disclosure.

DETAILED DESCRIPTION

Exemplary embodiments of the disclosure with now be discussed in further detail with regard to devices and methods for replacing buried utility piping while eliminating the need to perform a complete trench excavation to expose and remove the buried utility piping. It is to be understood that various structures, components, elements, etc., shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. It is to be understood that the terms "about" or "substantially" as used herein with regard to thicknesses, widths, lengths, etc., are meant to denote being close or approximate to, but not exactly. For example, the term "about" or "substantially" as used herein implies that a small different is present, such as 1% or less than the stated amount. The term "exemplary" as used herein means "serving as an example, instance, or illustration". Any embodiment or design described herein as "exemplary" is not to be construed as preferred or advantageous over other embodiments or designs.

Figure 1:
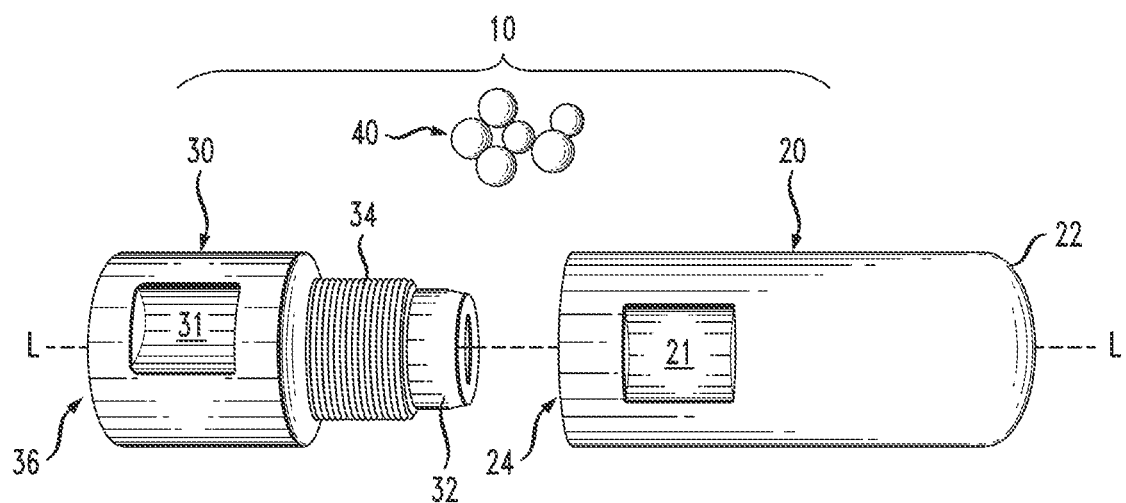
FIG. 1 is a perspective view of constituent components of a device for replacing buried utility piping with new utility piping, according to an exemplary embodiment of the disclosure.

FIG. 1 is a perspective view of constituent components of a device 10 (alternatively referred to herein as tool 10) for replacing buried utility piping with new utility piping, according to an exemplary embodiment of the disclosure. The device 10 comprises a first member 20, a second member 30, and ball bearings 40. The first member 20 (alternatively referred to herein as "female member" 20) comprises a cylindrical-shaped profile with opposing flattened regions 21, a tapered front-end 22, and a threaded tapered chamber 24. The second member 30 (alternatively referred to herein as "male member" 30) comprises a cylindrical-shaped profile with opposing flattened regions 31, a tapered front-end 32, a threaded portion 34, and a pipe adaptor connecting portion 36. In some embodiments, the constituent components 20, 30, and 40 of the device 10 are formed of hardened steel and fabricated using standard machining techniques.

Figure 2:
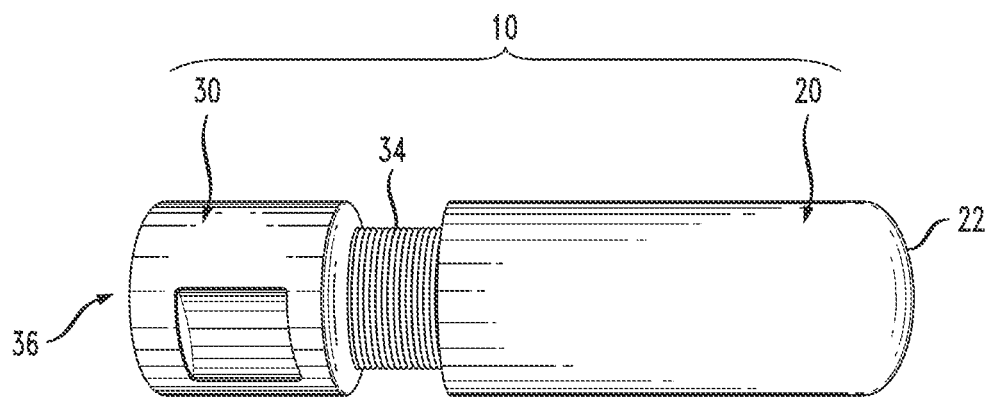
FIG. 2 is a perspective view of the device of FIG. 1 with the constituent components assembled, according to an exemplary embodiment of the disclosure.

FIG. 2 is a perspective view of the device 10 of FIG. 1 with the constituent components assembled, according to an exemplary embodiment of the disclosure. In particular, FIG. 2 illustrates an exemplary state of assembly of the tool 10 in which the threaded portion 34 (the male element) of the second member 30 is screwed into the threaded tapered chamber 24 (the female element) of the first member 20, wherein the ball bearings 40 (not shown in FIG. 2) would be disposed within the threaded tapered chamber 24 when using the tool 10.

FIG. 3 is a schematic cross-sectional view of constituent elements of the device along a center longitudinal axis, according to an exemplary embodiment of the disclosure. In particular, FIG. 3 is a schematic cross-sectional view of the first member 20 and second member 30 of the tool 10 along a center longitudinal axis denoted by a dashed line L as shown in FIGS. 1 and 3. As shown in FIG. 3, the first member 20 comprises an inner cylindrical channel 28 with an aperture 28A at the tapered front-end 22 of the first member 20. In addition, the threaded tapered chamber 24 comprises a threaded region 24-1 (e.g., female thread) and tapered inner sidewalls 24-2. As further shown in FIG. 3, the second member 30 comprises an inner cylindrical channel 38 with an aperture 38A at the tapered front-end 32 of the second member 30. Further, in some embodiments, the pipe adaptor connecting portion 36 comprises a threaded region 36-1 (e.g., female threads) which is configured to connect to an adapter element (e.g., male adaptor) which is connected to an end of a new pipe to be installed.

As schematically illustrated in FIG. 3, when the first and second members 20 and 30 are assembled together, the inner cylindrical channels 28 and 38 of the respective first and second members 20 and 30 are aligned to each other along the center longitudinal axis L. In some embodiments, the inner cylindrical channels 28 and 38 have a diameter which is sufficient to allow a pull cable (e.g., ½ in steel cable) to be inserted through the channels 28 and 38.

FIG. 4 is a schematic cross-sectional view of the device 10 with the constituent components assembled together with a pull cable 50 coupled to the device 10, according to an exemplary embodiment of the disclosure. In particular, FIG. 4 schematically illustrates a state of assembly in which the male threaded portion 34 of the second member 30 is screwed into the female threaded tapered chamber 24, with the pull cable 50 inserted through the inner cylindrical channels 28 and 38 of the respective first and second members 20 and 30. In addition, the hardened steel ball bearings 40 are disposed within the threaded tapered chamber 24 around a portion of the pull cable 50. In this state of assembly, the male and female members 20 and 30 are fully tightened together, whereby the tapered front end 32 of the male member 30 pushes the ball bearings 40 against the inner walls 24-2 of the threaded tapered chamber 24 of the female member 20, which results in the generation of a frictional compressive force of the ball bearings 40 against the wire cable 50. When the male and female members 20 and 30 are adequately tightened, the frictional compressive force of the ball bearings 40 against the pull cable 50 is effective to "connect" the pull cable 50 to the device 10 such that the pull cable 50 cannot be slidably moved through the inner cylindrical channels 28 and 38 of the first and second members 20 and 30.

As further shown in FIG. 4, the front end 22 of the first member 20 has a diameter which is sufficiently larger than an outer diameter of an existing pipe 60 which is to be removed. In this manner, the front end 22 of the first member 20 has sufficient area to make contact to an end portion of the existing pipe 60 and push against the pipe 60 when the tool 10 is pulled by the pull cable 50. In addition, FIG. 4 schematically illustrates an adapter element 72 (e.g., male adapter) connected to an end of a new pipe 70 to be installed, wherein the adapter element 72 is coupled to the pipe adaptor connecting portion 36 of the second member 30. As shown in FIG. 4, the overall diameter of the tool 10 is greater that the outer diameter of the new pipe 70 to be installed, which facilitates the installation of the new pipe 70 as the new pipe 70 is pulled underground by the device 10, as the device 10 is pulled underground by the pull cable 50, as explained now in further detail in conjunction with FIGS. 5A and 5B.

FIGS. 5A and 5B schematically illustrate a method for utilizing the assembled device shown in FIG. 4 for replacing a buried pipe 60 with a new pipe, according to an exemplary embodiment of the disclosure. FIG. 5A schematically illustrates an existing buried pipe 60 (e.g., water pipe, gas pipe, etc.) which is disposed below grade 100 (e.g., below ground 100) in contact with, e.g., soil. FIG. 5A schematically illustrates an initial phase of a pipe replacement process which involves exposing both ends of the existing buried pipe 60 to be replaced. In the illustrative embodiment of FIG. 5A, it is assumed that a first end 60-1 of the buried pipe 60 is exposed in a basement of a home or building, wherein the first end 60-1 of the buried pipe extends through a foundation wall 110 of the home/building below the grade 100. In addition, a second end 60-2 of the buried pipe 60-2 is exposed by digging an opening 102 in the ground to expose the second end portion 60-2 of the length of the buried pipe 60 to be replaced.

FIG. 5A schematically illustrates a next phase of the pipe replacement process which involves inserting the pull cable 50 through the buried pipe 60 extending out from both ends 60-1 and 60-2 of the buried pipe 60. In some embodiments, this process be performed as follows. At one end of the buried pipe 60, a nylon cord is inserted into the buried pipe 60 and the nylon cord is either pressure blown or vacuum sucked through the buried pipe 60 to the other end thereof. In some embodiments, a ¼ inch wire cable is attached to the nylon cord, and then the ¼ inch wire cable is pulled through the buried pipe 60 from one end to the other. Then, the wire pull cable 50 (e.g., ½ inch flexible steel wire cable) is attached to the ¼ inch wire cable and pulled through the buried pipe 60 from, e.g., the second end 60-2 to the first end 60-1 of the buried pipe 60. As a result, the wire pull cable 50 is inserted through the entire length of the buried pipe 60 and extends from both ends 60-1 and 60-2 of the buried pipe 60. In other embodiments, the wire pull cable 50 (e.g., ½ inch flexible steel wire cable) can be manually pushed through the buried pipe 60 from, e.g., the second end 60-2 to the first end 60-1. Other techniques can be used to insert the pull wire cable 50 through the buried pipe 60.

A next phase of the pipe replacement process comprises assembling the components of the tool 10 with the pull cable 50 frictionally coupled to the tool 10 and an end of the new pipe 70 attached to the tool 10 using the adaptor 72, as schematically illustrated in FIG. 4. In particular, at the end 60-1 of the buried pipe 60 where the tool 10 is to be connected to the pull cable 50, an approximate 2-foot length of the pull cable 50 preferably extends from the end 60-1 of the buried pipe 60. The end of the pull cable 50 is then inserted through the aperture 28A of the tapered front-end 22 of first member 20, through the inner cylindrical channel 28, and out from the threaded tapered chamber 24 of the first member 20. The hardened steel ball bearings 40 are then inserted into the threaded tapered chamber 24 around wire cable 50.

Next, the second member 30 of the tool 10 is slid over the end of the pull cable 50 by inserting the end of the pull cable 50 through the aperture 38A of the tapered front end 32, through the inner cylindrical channel 38, and out from the pipe adaptor-connecting portion 36 of the second member 30. Then, the male threaded portion 34 of the second member 30 is screwed into the female threaded tapered chamber 24 of the first member 20. As the first and second members 20 and 30 are tightened together, the tapered front end 32 of the second member 30 pushes the ball bearings 40 against the inner walls (e.g., tapered sidewalls 24-2) of the threaded tapered chamber 24 of the first member 20, which results in an increasing frictional compressive force of the ball bearings 40 against the pull cable 50. When the first and second members 20 and 30 are adequately tightened together, the frictional compressive force of the ball bearings 40 against the portion of the pull cable 50 within the tapered chamber 24 is effective to "connect" the pull cable 50 to the tool 10 such that the pull cable 50 cannot slide through the tool 10 or otherwise slip out when the tool 10 is being pulled through the ground by the pull cable 50. In some embodiments, the first and second members 20 and 30 can be screwed and sufficiently tightened together using, e.g., pipe wrenches that are applied to the flattened portions 21 and 31 on the outer surface of the first and second members 20 and 30.

Next, one end of the new pipe 70 is connected to the pipe adaptor connecting portion 36 of the second member 30 using any suitable type of standard adaptor element 72. In some embodiments, as shown in FIG. 4, the pipe adaptor connecting portion 36 of the second member 30 comprises female threads 36-1 to provide a female connection to a male end of the adaptor element 70. In another embodiment, the pipe adaptor connecting portion 36 of the second member 30 provides a male connection to a female end of an adaptor element. The remaining end length of the pull cable 50 is inserted into the end of the new pipe 70.

FIG. 5B schematically illustrates a next phase of the pipe replacement process which involves pulling the pull cable 50 to pull the tool 10 through the ground 100 with the new pipe 70 attached to the tool 10. For example, in some embodiments, the end 60-2 of the buried pipe 60 and the end of the pull cable 50 which extends from the end 60-2 of the buried pipe 60 are attached to either a backhoe, a truck or a winch, for example, to simultaneously pull the buried pipe 60 and the pull cable 50, so that the buried pipe 60 and the new pipe 70 are pulled together to thereby replace the buried pipe 60 with the new pipe 70. In particular, as the buried pipe 60 and pull cable 50 are simultaneously pulled, the pulling of the pull cable 50 causes a wide channel 104 (or void) to be created in the ground by the tool 10 as the tool 10 is pulled. Since the new pipe 70 is connected to the tool 10, the new pipe 70 is pulled underground (via pulling of the tool 10 by the wire cable 50) to fill the underground channel 104 that is created as the tool 10 bores through the ground 100 and the buried pipe 60 is removed.

More specifically, as shown in FIG. 5B, since the tool 10 has a larger diameter than the new pipe 70 being replaced, the tool 10 effectively creates a bore through the ground 100 with a larger diameter than the new pipe 70, thereby providing less resistance when pulling the new pipe 70 through the ground 100. For example, in some embodiments where the tool 10 is configured to replace a buried pipe with a new pipe, that has an outer diameter of 1 inch or less, the cylindrical-shaped first and second members 20 and 30 would have an outer diameter which is greater than 1 inch. Moreover, since the first member 20 of the tool 10 has the tapered front end 22, the tapered front end 22 effectively serves as a wedge that enables the tool 10 to more readily bore through the soil or dirt when being pulled by the pull cable 50.

Even though the buried pipe 60 can be pulled together with the pull cable 50, there can be a circumstance in which the buried pipe 60 breaks at some point (e.g., a loose or rotted joint, or rotted section of the buried pipe 60) as it is being pulled. In this instance, the remaining portion of the buried pipe 60 can still be removed, as the tapered front end 22 of the first member 20 of the tool 10 will push against the end of the remaining pipe 60 as the pull cable 50 is pulled. In an embodiment where the pull cable 50 is ½ inch in diameter, the wire cable 50 essentially occupies at least 60% or more of the inner space of the existing buried pipe 60 (¾" or 1" pipe), thereby essentially keeping the buried pipe 60 axially aligned to the tool 10, and allowing the surface area of the tapered front end 22 to effectively push against the end of the buried pipe 60 and continue the removal thereof.

It is to be understood that the tool 10 can be utilized with various types of piping, including, but not limited to, PVC (Polyvinyl Chloride) pipe, rigid copper pipe, plastic piping (e.g., medium or high-density polyethylene material), stainless steel piping, etc. The tool 100 can be utilized to replace buried piping that is used for various applications such as water pipes, gas pipes, electrical pipes, and other types of buried piping that are disposed below grade.

I claim:

1. A device, comprising:
a first member, a second member, and ball bearings;
wherein the first member comprises a first inner cylindrical channel, and a female threaded chamber;
wherein the second member comprises a second inner cylindrical channel, a male threaded portion, and a pipe adaptor connecting portion;
wherein the first member, the second member, and the ball bearings are configured for assembly with a pull cable inserted through the first and second inner cylindrical channels, wherein the first and second members are configured to be connectable by screwing the male threaded portion of the second member into the female threaded chamber of the first member with the ball bearings disposed within the female threaded chamber, such that a tightening of the connection between the first and second members causes the male threaded portion of the second member to forcibly push the ball bearings against inner walls of the female threaded chamber and against a portion of the pull cable disposed in the female threaded chamber to thereby create a frictional compressive force against the pull cable which is sufficient to prevent the pull cable from sliding within the first and second inner cylindrical channels; and
wherein the pipe adaptor connecting portion of the second member is configured for connection to a pipe adaptor element that is connected to an end of a pipe.

2. The device of claim 1, wherein the first member, the second member, and the ball bearings are formed of hardened steel.

3. The device of claim 1, wherein the first and second inner cylindrical channels each have a diameter of no less than ½ inch.

4. The device of claim 1, wherein the first and second members are cylindrical-shaped, wherein a front end of the first member has a tapered profile.

5. The device of claim 1, wherein the first and second members have an outer diameter which is greater than 1 inch.

6. The device of claim 1, wherein the male threaded portion of the second member comprises a tapered front end which is configured to press against the ball bearings disposed within the female threaded chamber of the first member.

7. The device of claim 1, wherein the female threaded chamber of the first member comprises tapered inner sidewall surfaces.

8. The device of claim 1, wherein the pipe adaptor connecting portion of the second member comprises a female threaded portion configured for connection with a male threaded portion of the pipe adaptor element.

9. The device of claim 1, wherein the pipe adaptor connecting portion of the second member is configured for connection to a pipe that has a diameter in a range of about ½ inch to about 1 inch.

10. A method for replacing a buried pipe with a new pipe, the method comprising:
exposing a first end and a second end of the buried pipe which is buried below ground;
inserting a pull cable through the buried pipe, wherein a first end of the pull cable extends out from the first end of the buried pipe, and wherein a second end of the pull cable extends out from the second end of the buried pipe;
connecting a tool to the first end of the pull cable which extends out from the first end of the buried pipe;
connecting the new pipe to the tool; and
pulling the second end of the pull cable together with the second end of the buried pipe to thereby pull the buried pipe and the tool through the ground;
wherein pulling the tool with the pull cable bores a channel in the ground, while pulling the new pipe connected to the tool through the bored channel within the ground;
wherein the tool comprises a first member, a second member, and ball bearings, wherein the first member comprises a first inner cylindrical channel, and a female threaded chamber, and wherein the second member comprises a second inner cylindrical channel, a male threaded portion, and a pipe adaptor connecting portion; and
wherein connecting the tool to the first end of the pull cable which extends out from the first end of the buried pipe, comprises:
inserting the first end of the pull cable through the first and second inner cylindrical channels;
placing the ball bearings within the female threaded chamber of the first member of the tool, wherein the balls bearings are disposed around a portion of the pull cable that is disposed in the female threaded chamber; and
connecting the first and second members together by screwing the male threaded portion of the second member into the female threaded chamber of the first member, whereby a tightening of the connection between the first and second members causes the male threaded portion of the second member to forcibly push the ball bearings against inner walls of the female threaded chamber and against the portion of the pull cable disposed in the female threaded chamber to thereby create a frictional compressive force against the pull cable which is sufficient to prevent the pull cable from sliding within the first and second inner cylindrical channels.

11. The method of claim 10, wherein the pull cable comprises a steel cable.

12. The method of claim 11, wherein the steel cable is about ½ inch in diameter.

13. The method of claim 10, wherein connecting the new pipe to the tool comprises:
connecting a pipe adaptor element to an end of the new pipe;
connecting the pipe adaptor element to the pipe adaptor connecting portion of the second member of the tool.

14. The method of claim 13, wherein the pipe adaptor connecting portion of the second member comprises a female threaded portion configured for connection with a male threaded portion of the pipe adaptor element.

15. The method of claim 10, wherein the first member, the second member, and the ball bearings of the tool are formed of hardened steel.

16. The method of claim 10, wherein the first and second members are cylindrical-shaped, wherein a front end of the first member has a tapered profile which serves as a wedge to bore the channel through the ground as the tool is pulled through the ground by the pull cable.

17. The method of claim 10, wherein the first and second members of the tool have an outer diameter which is greater than 1 inch.

18. The method of claim 10, wherein the male threaded portion of the second member of the tool comprises a tapered front end which is configured to press against the ball bearings disposed within the female threaded chamber of the first member.

19. The method of claim 10, wherein the female threaded chamber of the first member of the tool comprises tapered inner sidewall surfaces.

20. The device of claim 10, wherein the first and second inner cylindrical channels of the respective first and second members of the tool each have a diameter of no less than ½ inch.

* * * * *